United States Patent
Corry et al.

(10) Patent No.: US 6,848,639 B2
(45) Date of Patent: Feb. 1, 2005

(54) LOW TURBULENT FLOW HIGH SPEED CUTTER KNIFE

(75) Inventors: Judeth Brannon Corry, Manvel, TX (US); Cliff Knight, Houston, TX (US)

(73) Assignee: Borsig GmbH, Berlin (DE)

( * ) Notice: Subject to any disclaimer, the term of this patent is extended or adjusted under 35 U.S.C. 154(b) by 370 days.

(21) Appl. No.: 10/074,270

(22) Filed: Feb. 12, 2002

(65) Prior Publication Data

US 2003/0161909 A1 Aug. 28, 2003

(51) Int. Cl.[7] .............................................. B02C 18/14
(52) U.S. Cl. ................................. 241/292.1; 241/46.02; 425/313
(58) Field of Search ........................... 241/292.1, 46.02, 241/46.06, 46.08; 425/313

(56) References Cited

U.S. PATENT DOCUMENTS

| 4,569,810 A | 2/1986 | Oriot et al. |
| 5,052,911 A | 10/1991 | Mikeska |
| 5,679,380 A | 10/1997 | Munz et al. |

FOREIGN PATENT DOCUMENTS

| EP | 0 914 915 A1 | 5/1999 |

*Primary Examiner*—Mark Rosenbaum
(74) *Attorney, Agent, or Firm*—McGlew and Tuttle, P.C.

(57) ABSTRACT

A cutting blade includes a connection portion for connection to a cutting head for rotating the blade, preferably in association with other blades being rotated with the cutting head. The blade body also includes a blade body portion with a leading edge with a cutting blade portion and an upper leading surface and lower leading surface extending from the leading edge to an upper transition zone and lower transition zone respectively. A upper trailing surface extends from the upper transition zone to a trailing edge and a lower trailing surface extends from the lower transition zone to the trailing edge. The upper and lower trailing surfaces converge such that the blade body portion is hydrodynamically shaped. According to a further embodiment, the cutting blade has a sickle shape. Specifically the cutting blade portion progresses from a leading location toward a trailing location of this leading edge or cutting edge as it extends radially outwardly from the blade body connection portion toward a radially outer end of the blade knife portion. The blade knife body is advantageously used as part of an underwater pelletizer with a shaft supporting the blade knife body. The pelletizer fluid passage structure forms the fluid coolant flow passage and supports the shaft. A pelletizing die plate is disposed such that the polymer material is extruded into the coolant flow passage and is cut by the blade.

19 Claims, 3 Drawing Sheets

LOW TURBULENT FLOW HIGH SPEED CUTTER KNIFE

FIELD OF THE INVENTION

The invention relates to a cutting system generally and more particularly to a rotating cutting knife cutting extruded material especially thermoplastic material extruded with an underwater pelletizing die plate.

BACKGROUND OF THE INVENTION

Pelletizing dies are utilized by polymer manufacturers for the purpose of converting their product into pellet form for bulk shipment to fabricators of plastic components. These fabricators require that the pellets meet minimum shape and size specifications. The ideal pellet will have a good length to diameter aspect ratio with a smooth skin and no tails or strings of polymer stretching from the pellet. The ideal pellet will maintain this characteristic shape during all operations.

As the demand for polymers increases, larger production lines are desired by the manufactures to economize production of the pellets. As the pelletizing dies become larger, the percentage of pellets produced that meet the required quality standard is reduced.

Compounding the problem is the fact that fabricators of plastic components are tightening the specifications as to the definition of a good pellet. The pellets that do not meet fabricators specifications must be re-melted or sold off at greatly reduced prices.

Pellets of poor quality result for a variety of reasons, poor heat distribution, poor heat control, improper cooling effects, incorrect geometries in the polymer channels and orifices, and improper cutting conditions to name a few Several companies worldwide manufacture pelletizing dies. They have achieved some improvement in quality with empirical or trial and error methods. However, such manufacturers have been unable to resolve the pellet quality problem to the satisfaction of the polymer fabricators.

U.S. Pat. No. 5,679,380 includes a discussion of issues of pellet quality. It was noted that the pellet quality is positively affected by keeping the thermoplastics to be pelletized above solidification temperature until their exit from the holes or nozzles of the pelletizing die plate. It is mentioned that this gives rise to problems due to the fact that the molten plastics must be cooled directly after the exit from the holes of the pelletizing die plate. The use of a cooling bath results in a considerable temperature drop from the outside to the inside of the pelletizing die plate. The prior art solutions focus on heat supply and transfer issues at the die as well as the wearing protection issues as to the die outer surface exposed to cooling fluid flow. The knives, which are also believed to be a factor leading to pellet quality problems are not discussed in detail.

SUMMARY AND OBJECTS OF THE INVENTION

It is an object of the invention to provide a knife for cutting machinery, particularly for high-speed applications with improved hydrodynamic qualities, particularly useful for cutting all kinds of polymer in an underwater pelletizing machine.

It is still another object of the invention to provide a knife blade part, particularly for high-speed cutting applications wherein the knife cooperates with a pelletizing die to provide a quality cutting as well as to extend the lifetime of the pelletizing die plate and to provide uniform flow in a cutting area so as to avoid cavitation on the surface of the pelletizing die plate and wherein the deflection of the knife due to forces caused by contact pressure are minimized In industry, an underwater pelletizer is employed to cut the plastic extrudate into so called "pellets", which are shipped to end users to make finished products. The underwater pelletizer is a machine that quenches and cuts the extrudate as the extrudate leaves the pelletizing die. The invention provides a cutting blade part which is particularly useful in an underwater pelletizer die, particularly for a knife blade part that rotates with respect to the pelletizer die to cut the pellets The invention improves the quality of the pellets based on features of the knife and how the knife interacts with the die as well as the interaction of the knife blade part with the fluid.

According to the invention, a hydrodynamically shaped pelletizing knife blade portion is provided. The profile is such as to reduce low-pressure zones in the flow area, thereby reducing cavitation and reducing dragging on the knife blade so as to improve the quality of underwater pelletizing.

The knife blade is an extruder cutting blade part with a blade body connection portion and a knife blade body portion The knife blade body portion has a leading edge with a cutting blade portion and an upper leading surface and a lower leading surface extending from said leading edge to a transition zone and a blade body trailing edge and an upper and lower trailing surface extending from said transition zone to said trailing edge. The upper and lower trailing surfaces converge to form the hydrodynamically shaped knife blade body portion.

The hydrodynamically shaped knife blade body portion upper trailing surface and lower trailing surface may converge to form a continuously diminishing cross section from the transition zone to the trailing edge. The upper leading surface extends upwardly and in a trailing edge direction from said leading edge to said transition zone. This upper leading surface may extend upwardly from the blade edge at an angle of e.g., 45°. The lower trailing surface extends substantially in a trailing edge direction from said leading edge to said transition zone.

The hydrodynamically shaped pelletizing knife blade may have a cutting blade that has a sickle shape. The sickle shape includes the cutting blade portion progressing from a leading location toward a trailing location as it extends radially outwardly from the blade body connection portion.

The hydrodynamically shaped pelletizing knife blade may be provided in combination with a die plate and coolant flow structure. A shaft supports the knife blade with the hydrodynamically shaped body. A pelletizer fluid passage structure (cap) forms the fluid coolant flow passage and supports the shaft. The pelletizing die plate is disposed such that the polymer material is extruded into the fluid coolant flow passage and is cut by the blade.

According to another feature of the invention a pelletizing knife blade body is provided with a knife blade part having a sickle shape. The sickle shape, with a blade edge progressing from a leading blade location toward a trailing blade location as it extends radially outwardly from a blade body connection portion provides an improved slice cut and avoids any chopping cut, which chopping cut is otherwise harmful to pellet quality. The sickle shape distributes loads on the pellets in an advantageous way with the resulting cut being softened.

The pelletizing knife blade body with a knife blade part having a sickle shape may have knife blade body portion upper and lower trailing surfaces extending from the transition zone to the trailing edge converging to form a hydrodynamically shaped knife blade body portion.

An underwater pelletizer is also provided with a shaft supporting a knife blade part having a sickle shape. A pelletizer fluid passage structure (cap) forms the fluid coolant flow passage and supports the shaft. The pelletizing die plate is disposed such that the polymer material is extruded into the fluid coolant flow passage and is cut by the blade.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiments of the invention is illustrated.

DESCRIPTION OF THE PREFERRED EMBODIMENTS

Figure 1:
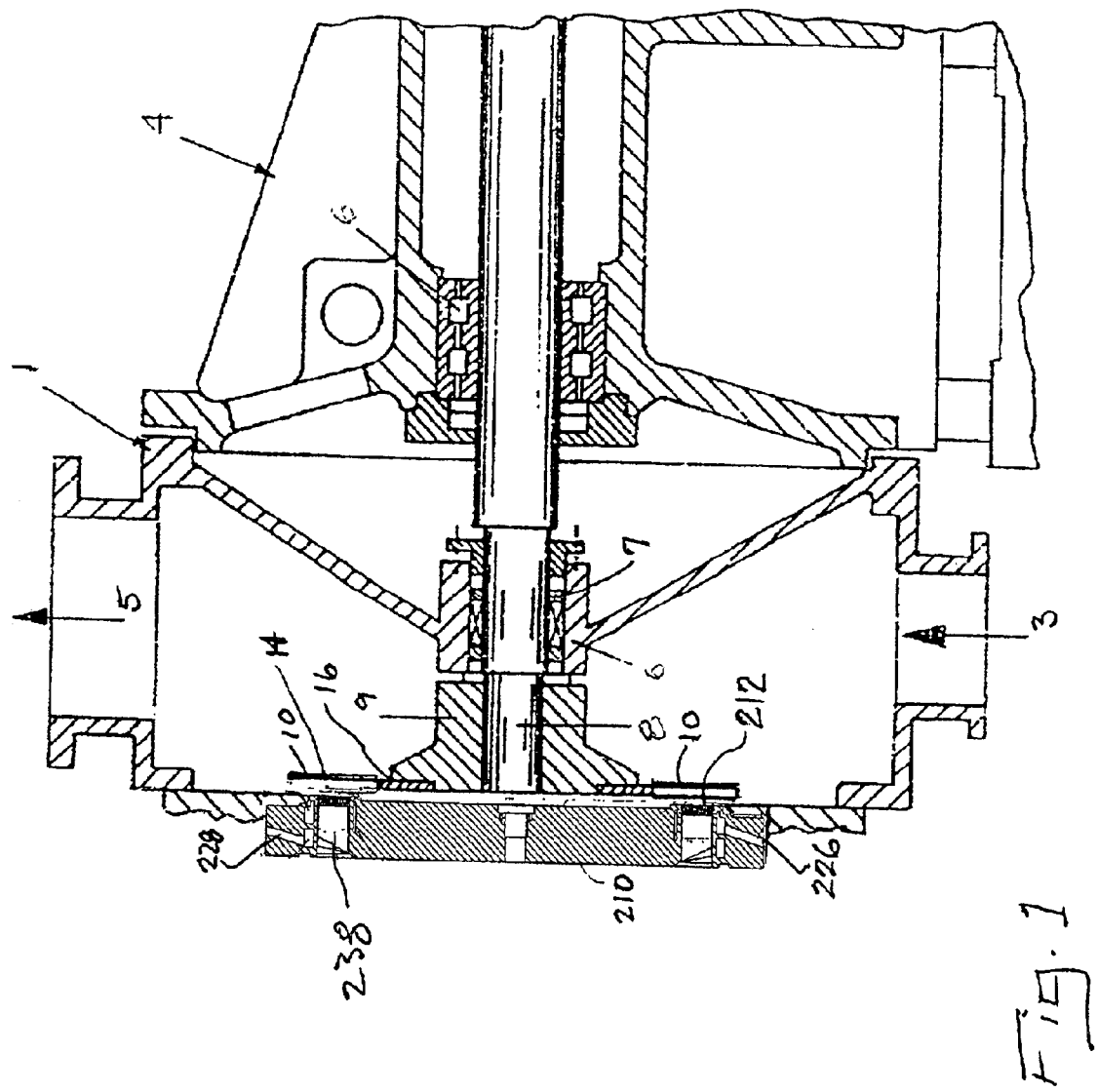
FIG. 1 is a schematic sectional view of an underwater pelletizing die plate and cutter of an underwater pelletizer machine according to the invention.

Referring to the drawings in particular, FIG. 1 shows an underwater pelletizer generally designated 1, which pelletizer is advantageously provided with a knife blade part 10 or a knife blade part 110 according to the invention. The underwater pelletizer die includes a pelletizer cooling passage structure or cap 2 that has a coolant flow entry 3 and a coolant flow exit 5. The cap 2 is connected to a pelletizer housing 4 which has a pelletizer cap bearing 6' supporting a shaft 8. The cap 2 defines a coolant passage which may be formed with the pelletizer cap bearing 6' having a seal 7 for the shaft 8. The shaft 8 is connected to a cutting head 9 which supports a plurality of knife blade parts 10 (or 110). A pelletizer housing bearing 6 located in the pelletizer housing 4, supports the shaft 8 at a location which is spaced from the pelletizer cap bearing 6'. The spaced arrangement of the pelletizer cap bearing 6' and the pelletizer housing bearing 6 provide a stable support for the shaft 8 intended to minimize deflection of the cutting head 9.

A pelletizing die plate 210 is provided connected to the cap and/or disposed with the pelletizing die plate 210 having exit orifices leading to the coolant passages within cap 2. The pelletizing die plate 210 includes several extrusion orifice sections 212. The pelletizing die plate 210 also has a heat medium supply line 226 and a heat medium discharge 228 to supply the necessary heat to heat the polymer within polymer channels 238.

Figure 2:
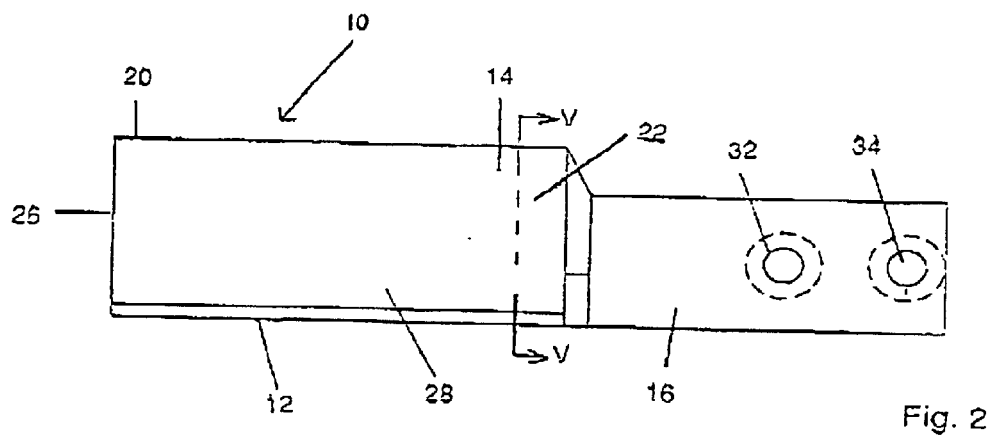
FIG. 2 is a top view of a first embodiment of a knife blade part according to the invention.

FIG. 2 shows a knife blade part 10 according to a first embodiment of the invention. The knife blade part 10 includes a knife blade body portion 14 and a blade body connection portion 16. The blade body connection portion 16 includes fastener openings 32 and 34 for connecting the knife blade part 10 to the cutting head 9. The connection between the cutting head 9 and several knife blade parts 10 forms a rotating cutting blade assembly with a radially inner point having the various blade body connection portions 16, connecting the various knife blade parts 10 to the cutting head 9 as well as the radially outer portion with the various knife blade portions 14, that interact with the extrusion orifice sections 212.

Figure 4:
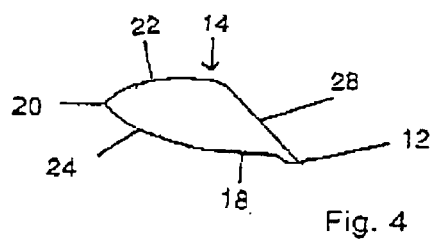
FIG. 4 is a cross sectional view of the knife blade portion of the knife blade part of FIG. 2.
Figure 5:
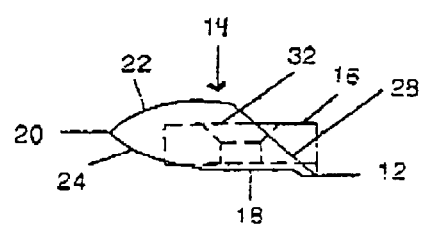
FIG. 5 is a cross sectional view taken along line V—V of FIG. 2.

The knife blade body portion 14 of the knife blade part 10 includes a leading edge or knife edge 12 and an opposite trailing edge 20. The leading surfaces include the upper leading surface 28. In the example, upper leading surface 28 forms a 45° angle with respect to the general plane of the pelletizing die plate 210 (the plane of cutting). Although other angles are possible, the 45° angle promotes a proper movement of the pellets away from the cutting face of the pelletizing die plate 210 while also providing good hydrodynamic qualities. The knife blade body portion 16 includes a lower leading surface 18 which extends rearwardly from the knife edge 12. This surface is somewhat recessed with respect to the knife edge 12 in the preferred embodiment (an undercut structure). Following the leading surfaces of the knife blade body portion 14, an upper transition zone is provided followed by the upper trailing surface 22 and a lower transition zone is provided followed by the lower trailing surface 24. The upper trailing surface 22 and the lower trailing surface 24 converge at trailing edge 20 to form a hydrodynamically shaped blade body portion 14. These features are best seen in FIGS. 4 and 5.

The upper trailing surface 22 leading from the transition zone to the trailing edge 20 is formed so as to be curved as it converges with the lower trailing surface 24. In a similar manner the lower trailing surface 24 is formed as a curved surface with a first curved part and a second curved part. The two curved portions with different centers of curvature form a curved trailing surface with the degree of convergence with the upper trailing surface 22 increasing toward the trailing edge 20. These features are best seen in FIG. 4.

Figure 3:
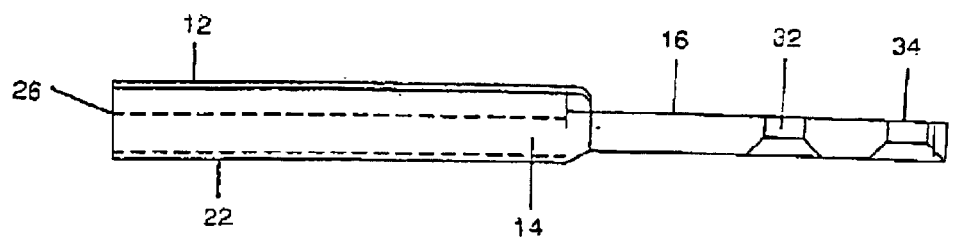
FIG. 3 is a front view of the knife blade part of FIG. 2.

The hydrodynamic knife blade part 10 has a radially outer end 26. This is shown as a flat outer edge surface which may be radially outwardly of the extrusion orifice sections 212. However, this outer end 26 may also be shaped to provide superior hydrodynamic features. Further, a transition zone between the blade body connection portion 16 and the cutting knife blade body portion 14 may also be tapered as shown in FIGS. 2 and 3 to provide advantageous hydrodynamic properties.

Figure 6:
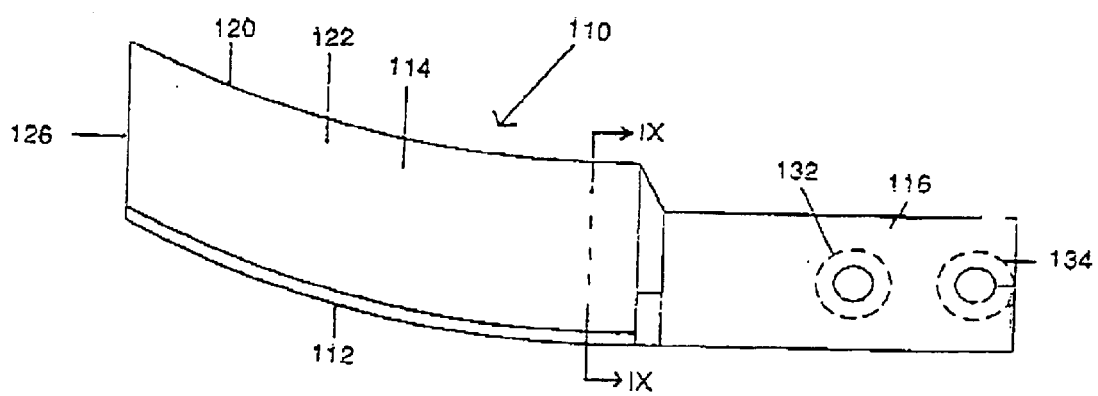
FIG. 6 is a top view of a second embodiment of a knife blade part according to the invention.

FIG. 6 shows a top view of an alternative embodiment of a knife blade part 110 according to the invention. The knife blade part includes a knife blade portion 114 with a blade body connection portion 116. The blade body connection portion 116 includes fastener openings 132 and 134 for connection of the knife blade part 110 to a cutting head 9. The knife blade part 110 also has an outer end 126 which is similar to the outer end 26 of the knife blade part 10. However, the leading edge or knife edge 112 has a particular sickle shape. This sickle shape particularly includes a knife blade body portion 114 which has a cutting blade leading edge which progresses from a forward most or leading location toward a rear-most or trailing location as this leading blade edge extends radially outwardly from the blade body connection portion 116 to the radially outer end 126. This curve or trailing off from the leading most radially inner part of the leading edge 112 to the trailing most radially outer part of the leading edge may be provided with a constant curvature. The sickle shape provides advantageous blade cutting dynamics and particularly avoids a chopping cut and improves the nature of the slice cut so as to improve pellet quality. This allows for a better distribution of loads on the pellets and allows a softening of the cut. The cutting dynamics are generally improved with improved pellet quality.

Figure 7:
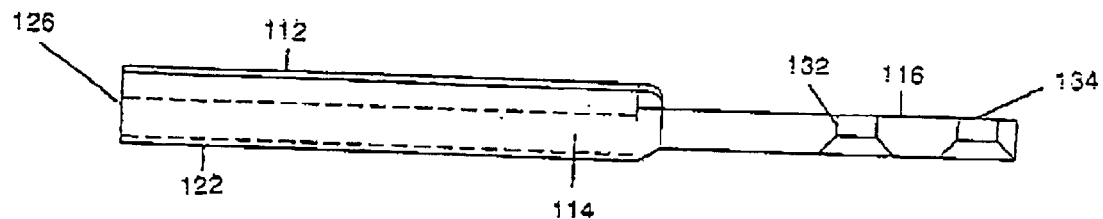
FIG. 7 is a front view of the knife blade part of FIG. 6.

FIG. 7 is a front view of the knife blade of FIG. 6 showing all the details of this figure.

Figure 8:
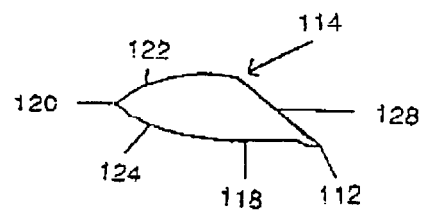
FIG. 8 is a cross sectional view of the knife blade portion of the knife blade part of FIG. 6.
Figure 9:
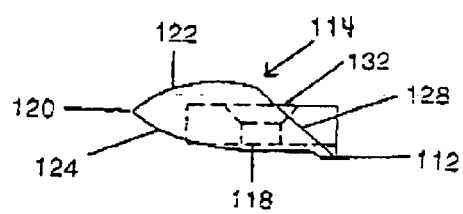
FIG. 9 is a cross sectional view taken along line IX—IX of FIG. 6.

Further, the knife blade according to the second embodiment of FIG. 6 advantageously also has a hydrodynamic knife blade body portion 114 as can be seen in FIGS. 8 and 9. The knife blade body portion 114 has an upper leading surface 128 which is a continuation from the knife edge or leading edge 112. The knife edge or leading edge 112 has a lower side surface 118 which continues substantially toward the trailing edge 120 at a cutting level and advantageously has a cut in or step to the lower side surface 118 which extends substantially parallel to the cutting plane. Upper and lower transition regions at the transition from the leading surface to the trailing surface are followed by upper trailing surface 122 and lower trailing surface 124 which converge to trailing edge 120.

As can best be appreciated from FIG. 9, the trailing surfaces are advantageously formed as curved surfaces. The lower trailing surface 124 includes a first curved part which transitions to a second curved part. The upper trailing surface 122 similarly is formed of two curved parts including an upper curved surface and another curved surface. With this structure, the upper trailing surface 122 is continuously curved but the rate of convergence with the lower surface 124 increases toward the trailing edge 120. In a similar manner, the lower trailing surface 124 is continuously curved but the rate of convergence toward upper trailing surface 122 increases toward the trailing edge 120.

While specific embodiments of the invention have been shown and described in detail to illustrate the application of the principles of the invention, it will be understood that the invention may be embodied otherwise without departing from such principles.

What is claimed is:

1. An extruder cutting blade comprising:
   a blade body connection portion;
   a blade body portion with a leading edge with a cutting blade portion and an upper leading surface and a lower leading surface extending from said leading edge to an upper transition zone and a lower transition zone respectively provided followed by an upper trailing surface and a lower trailing surface respectively and a blade body trailing edge and the upper and lower trailing surface extending from said upper and lower transition zone respectivley to said trailing edge, said upper and lower trailing surface conversing at said trailing edge, the upper trailing surface leading from the upper transition zone to the trailing edge is formed so as to be curved as it converses with the lower trailing surface and the lower trailing surface is formed as a curved surface with a first curved part and a second curved part, whereby the two curved portions with different centers of curvature form a curved trailing surface with the degree of convergence with the upper trailing surface increasing toward the trailing edge.

2. An extruder cutting blade arrangement, according to claim 1, wherein said hydrodynamically shaped blade body portion includes said upper trailing surface and said lower trailing surface converging to form a continuously diminishing cross section from said upper and lower transition zone to said trailing edge.

3. An extruder cutting blade arrangement, according to claim 1, wherein said upper leading surface extends upwardly and in a trailing edge direction from said leading edge to said upper transition zone and said lower leading surface extends rearwardly and in a trailing edge direction from said leading edge to said lower transition zone.

4. An extruder cutting blade arrangement, according to claim 1, wherein said blade body portion with a leading edge with a cutting blade portion has a sickle shape.

5. An extruder cutting blade arrangement, according to claim 4, wherein said sickle shape includes said cutting blade portion progressing from a leading location toward a trailing location as it extends radially outwardly from said blade body connection portion.

6. An extruder cutting blade arrangement, according to claim 1, for application in an underwater pelletizer, further comprising:
   a shaft;
   a pelletizer fluid passage structure forming a fluid coolant flow passage, said shaft being supported relative to said fluid passage with said shaft extending into said fluid coolant flow passage;
   a pelletizer die plate with a plastic extrudate side in said fluid coolant flow passage; and
   an extruder cutting blade with a blade body connection portion connected to said shaft and a blade body portion with a leading edge with a cutting blade portion and an upper leading surface and a lower leading surface extending from said leading edge to an upper transition zone and a lower transition zone respectively provided followed by an upper trailing surface and a lower trailing surface respectively and a blade body trailing edge and the upper and lower trailing surface extending from said upper and lower transition zone respectively to said trailing edge, said upper and lower trailing surface converging at said trailing edge to form a hydrodynamically shaped blade body portion with said pelletizer die plate being disposed such that the polymer material is extruded into the fluid coolant flow passage and is cut by said blade.

7. An arrangement according to claim 6, wherein said hydrodynamically shaped blade body portion includes said upper trailing surface and said lower trailing surface converging at said trailing edge to form a continuously diminishing cross section from said upper and lower transition zone to said trailing edge.

8. An arrangement according to claim 6, wherein said upper leading surface extends upwardly and in a trailing edge direction from said leading edge to said upper transition zone and said lower leading surface extends rearwardly and in a trailing edge direction from said leading edge to said lower transition zone.

9. An arrangement according to claim 6, wherein said blade body portion with said leading edge with the cutting blade portion has a sickle shape with the blade of said cutting blade portion progressing from a leading location toward a trailing location as it extends radially outwardly from said blade body connection portion.

10. An extruder cutting blade, comprising:
    a blade body connection portion;
    a blade body portion with a leading edge with a cutting blade portion and upper and lower leading surfaces extending from said leading edge to an upper transition zone and a lower transition zone respectively followed by upper trailing surface and lower trailing surface respectively and a blade body trailing edge and the upper and lower trailing surface extending from said upper and lower transition zone respectively to said trailing edge, said upper and lower trailing surface converging at said trailing edge, the upper trailing surface leading from the upper transition zone to the trailing edge is formed so as to be curved as it converges with the lower trailing surface and the lower trailing surface is formed as a curved surface with a first curved part and a second curved part, whereby the two curved portions with different centers of curvature form a curved trailing surface with the degree of convergence with the upper trailing surface increasing toward the trailing edge said cutting blade having a sickle shape.

11. An extruder cutting blade, according to claim 10, wherein said sickle shape includes said cutting blade portion progressing from a leading location toward a trailing location as it extends radially outwardly from said blade body connection portion.

12. An extruder cutting blade, according to claim 11, wherein said upper and lower trailing surface extend from said upper and lower transition zone respectively to said trailing edge and said upper and lower trailing surface converge at said trailing edge to form a hydrodynamically shaped blade body portion.

13. An extruder cutting blade, according to claim 10, wherein said upper and lower trailing surface converge at said trailing edge to form a continuously diminishing cross section from said upper and lower transition zone to said trailing edge.

14. An extruder cutting blade, according to claim 12, wherein said upper leading surface extends upwardly and in a trailing edge direction from said leading edge to said upper transition zone and said lower leading surface extends rearwardly and in a trailing edge direction from said leading edge to said lower transition zone.

15. An extruder cutting blade comprising:

a connection portion;

a blade portion attached to said connection portion, said blade portion including a leading edge and a first leading surface extending from said leading edge to a first transition zone in a trailing direction, a first trailing surface extends from said first transition zone in said trailing direction to a trailing edge, said blade portion also including a second leading surface extending from said leading edge to a second transition zone in said trailing direction, a second trailing surface extends from said second transition zone in said trailing direction to said trailing edge, said first and second trailing surfaces having a convex curve.

16. An extruder cutting blade according to claim 15, wherein:

said first and second trailing surfaces have said convex curve continuously from respective said transition zones to said trailing edge.

17. An extruder cutting blade according to claim 15, wherein:

said convex curve of said second trailing surface is shaped to converge with said first trailing surface, a degree of convergence of said second trailing surface increases toward said trailing edge.

18. An extruder cutting blade according to claim 15, wherein:

said second trailing surface includes a first curved part and a second curved part with different centers of curvature, said second trailing surface having a degree of convergence with said first trailing surface that increases toward said trailing edge.

19. An extruder cutting blade according to claim 18, wherein:

said two curved parts with different centers of curvature form said degree of convergence that increases toward said trailing edge.

* * * * *